United States Patent
Inooka

(10) Patent No.: US 9,183,358 B2
(45) Date of Patent: Nov. 10, 2015

(54) ELECTRONIC CONTENT PROCESSING SYSTEM, ELECTRONIC CONTENT PROCESSING METHOD, PACKAGE OF ELECTRONIC CONTENT, AND USE PERMISSION APPARATUS

(75) Inventor: Hidehiro Inooka, Tokyo (JP)

(73) Assignees: Sony Corporation, Tokyo (JP); Sony Computer Enterntainment Inc., Tokyo (JP)

( * ) Notice: Subject to any disclaimer, the term of this patent is extended or adjusted under 35 U.S.C. 154(b) by 0 days.

(21) Appl. No.: 13/611,243

(22) Filed: Sep. 12, 2012

(65) Prior Publication Data
US 2013/0007892 A1 Jan. 3, 2013

Related U.S. Application Data

(63) Continuation of application No. PCT/JP2010/007066, filed on Dec. 3, 2010.

(30) Foreign Application Priority Data

Apr. 14, 2010 (JP) .................................. 2010-093513

(51) Int. Cl.
*G06F 21/60* (2013.01)
*G06F 21/10* (2013.01)
(Continued)

(52) U.S. Cl.
CPC .............. *G06F 21/10* (2013.01); *G06F 21/305* (2013.01); *G11B 20/00086* (2013.01);
(Continued)

(58) Field of Classification Search
CPC ......... G06F 21/60; G06F 21/10; G06F 21/62; G06F 2211/007; H04L 63/0428; H04L 12/40104; G11B 20/0021; G11B 20/00876; G11B 20/00195

USPC .............. 380/4, 200, 227–228; 713/150, 171, 713/182; 726/2–30
See application file for complete search history.

(56) References Cited

U.S. PATENT DOCUMENTS 6,134,631 A    10/2000  Jennings
7,124,443 B2 * 10/2006  Ishibashi et al. ................ 726/26
(Continued)

FOREIGN PATENT DOCUMENTS

CN    1174352 A    2/1998
CN    1556943 A    12/2004
(Continued)

OTHER PUBLICATIONS

Intel et al. "Advanced Access Content System (AACS), Pre-recorded Video Book", Nov. 29, 2007, Revision 0.92.*
(Continued)

*Primary Examiner* — Michael Chao
*Assistant Examiner* — Shiuh-Huei Ku
(74) *Attorney, Agent, or Firm* — Matthew B. Dernier, Esq.

(57) ABSTRACT

A game playing system includes a use permission tag provided for use in a game disk for a user of a game, a disk drive, and a reproduction device for reproducing the game. The disk drive reads out a disk ID from the game disk. When the game is to be played, the reproduction device conveys the disk ID and a player ID to the use permission tag. The use permission tag stores the terms of use of the game and determines whether a combination of the disk ID and the player ID conveyed from the reproduction device fulfills the terms of use or not.

16 Claims, 9 Drawing Sheets

GAME PLAYING SYSTEM 1000

(51) Int. Cl.
*G06F 21/30* (2013.01)
*G11B 27/10* (2006.01)
*G11B 20/00* (2006.01)
*G06F 21/62* (2013.01)
*H04L 29/06* (2006.01)

(52) U.S. Cl.
CPC ... *G11B 20/00181* (2013.01); *G11B 20/00195* (2013.01); *G11B 27/105* (2013.01); *H04L 67/38* (2013.01); *G06F 2221/2101* (2013.01); *G06F 2221/2109* (2013.01); *G06F 2221/2129* (2013.01); *G06F 2221/2141* (2013.01); *G06F 2221/2153* (2013.01); *H04L 63/08* (2013.01)

(56) References Cited

U.S. PATENT DOCUMENTS

| | | | | |
|---|---|---|---|---|
| 7,545,271 | B2* | 6/2009 | Jalkanen et al. | 340/572.1 |
| 8,402,555 | B2 | 3/2013 | Grecia | |
| 8,533,860 | B1 | 9/2013 | Grecia | |
| 2003/0152222 | A1* | 8/2003 | Nakano et al. | 380/201 |
| 2005/0021992 | A1* | 1/2005 | Aida et al. | 713/200 |
| 2007/0116280 | A1* | 5/2007 | Takashima | 380/228 |
| 2007/0219910 | A1* | 9/2007 | Martinez | 705/51 |
| 2008/0215625 | A1* | 9/2008 | Veitch et al. | 707/104.1 |
| 2009/0089593 | A1* | 4/2009 | Kuno et al. | 713/193 |

FOREIGN PATENT DOCUMENTS

| | | |
|---|---|---|
| JP | 2002024449 A | 1/2002 |
| JP | 2003132623 A * | 5/2003 |
| JP | 2004046708 A | 2/2004 |
| JP | 2004090838 A | 3/2004 |

OTHER PUBLICATIONS

Intel et al. "Advanced Access Content System (AACS), Blu-ray Disc Pre-recorded Book", Jun. 6, 2008, Revision 0.921.*
Intel et al. "Advanced Access Content System (AACS), Introduction and Common Crytographic Elements", Feb. 17, 2006, Revision 0.91.*
Intel et al. "Advanced Access Content System (ACCS), Pre-recorded Video Book", Nov. 29, 2007, Revision 0.92.*
Intel et al. "Advanced Access Content System (ACCS), Blue-ray Disc Pre-recorded Book", Jun. 6, 2008, Revision 0.921.*
International Search Report for corresponding PCT Application PCT/JP2010/007066, dated Jan. 18, 2011.
International Preliminary Report on Patentability for corresponding PCT Application PCT/JP2010/007066, dated Nov. 6, 2012.
Office Action issued for corresponding Japanese Patent Application No. 2010-093513, Nov. 5, 2013.
Office Action issued for corresponding Chinese Patent Application No. 2010800661288, Sep. 23, 2014.

* cited by examiner

| DISK ID | LEGITIMATE USE DEVICE ID |
|---------|--------------------------|
| 001 | aaaaa |

FIG.6

| DISK ID | TEMPORARY USE DEVICE ID | THE NUMBER OF TEMPORARY USES |
|---------|------------------------|------------------------------|
| 001     | yyyyy                  | 3                            |
| 001     | zzzzz                  | 1                            |

ELECTRONIC CONTENT PROCESSING SYSTEM, ELECTRONIC CONTENT PROCESSING METHOD, PACKAGE OF ELECTRONIC CONTENT, AND USE PERMISSION APPARATUS

BACKGROUND OF THE INVENTION

1. Field of the Invention

The present invention relates to a data processing technology, and more particularly to a technology for reproducing electronic content stored in a recording medium.

2. Description of the Related Art

Recent years have seen widespread use of terminal apparatuses, each provided with a drive for reading data from a recording medium, which processes electronic content stored in the recording media. The terminal apparatus, which is a game device, for instance, reads out a game application (hereinafter referred to as "game AP" also) recorded optically or magnetically in a recording medium such as DVD.

A technology of digital rights management (DRM) is introduced to prevent the electronic content from being used unlimitedly.

Typically, DRM is a technology for the prevention of the unlimited copy of electronic content. To this end, the inventor recognized that there are cases where it is difficult to suitably restrict the use of electronic content, stored in the recording medium like DVD and commercially traded, according to the attributes of use entities of the electronic content.

SUMMARY OF THE INVENTION

The present invention has been made in view of the aforementioned problems, and the main purpose thereof is to provide a technology for restricting the use of electronic content store in a recording medium according to the use entities of the electronic content.

In order to resolve the above-described problems, an electronic content processing system according to one embodiment of the present invention includes: a use permission apparatus provided for use in a recording medium that stores electronic content for a user of the electronic content; a medium drive configured to read the electronic content from the recording medium; and a reproduction device configured to reproduce the electronic content read by the medium drive. The medium drive has a security management unit configured to read from the recording medium an article ID that is an ID of the electronic content or the recording medium. The reproduction device has a security management unit configured to convey a reproduction entity ID, which is a reproduction device ID or a user ID, together with the article ID read by the medium drive to the use permission apparatus when the electronic content is to be reproduced. The use permission apparatus includes: a use condition storage for storing a use condition that defines an attribute of an entity accessible to the electronic content; and a determining unit for determining whether or not a combination of the article ID and the reproduction entity ID conveyed from the reproduction device fulfills the use condition. The security management unit of the reproduction device determines a reproduction mode of the electronic content based on a decision result as to whether or not the combination thereof fulfills the use condition.

Another embodiment of the present invention relates also to an electronic content processing system. The electronic content processing system includes: a use permission apparatus provided for use in a recording medium that stores electronic content for a user of the electronic content; and a reproduction device configured to reproduce the electronic content stored in the recording medium. The reproduction device has a security management unit configured to convey a reproduction entity ID, which is a reproduction device ID or a user ID, when the electronic content is to be reproduced. The use permission apparatus includes: a use condition storage for storing a use condition that defines an attribute of an entity accessible to the electronic content; and a determining unit for determining whether or not the reproduction ID conveyed from the reproduction device fulfills the use condition. The security management unit of the reproduction device determines a reproduction mode of the electronic content based on a decision result as to whether or not the reproduction entity ID fulfills the use condition.

Still another embodiment of the present invention relates to a use permission apparatus. The user permission apparatus is an apparatus provided for use in a recording medium that stores electronic content for a use of electronic content, and the use permission apparatus includes: a use condition storage configured to store a use condition that defines an attribute of an entity accessible to the electronic content; a receiving unit configured to receive an ID of a reproduction entity ID, which is a reproduction device ID or a user ID, from the reproduction device that reproduces the electronic content stored in the recording medium; a determining unit configured to determine whether the reproduction entity ID conveyed from the reproduction device fulfills the use condition or not; and a conveying unit configured to convey a decision result, regarding whether the reproduction entity ID fulfills the use condition or not, to the reproduction device.

Still another embodiment of the present invention relates to an electronic content processing method. The method includes: conveying a reproduction entity ID, which is a reproduction device ID or a user ID, from a reproduction device, which is to reproduce electronic content stored in a recording medium, to a use permission apparatus provided for use in the recording medium for a user of the electronic content; determining whether the reproduction entity ID conveyed from the reproduction device fulfills a use condition or not, wherein the determining is performed by the user permission apparatus that references a use condition that defines an attribute of an entity accessible to the electronic content stored in a predetermined storage area; and determining a reproduction mode of the electronic content according to a decision result regarding whether the reproduction entity ID fulfills the use condition or not.

Still another embodiment of the present invention relates to a package of electronic content available in a commercial transaction. The package of electronic content includes and is supplied with: a recording medium storing the electronic content; a use permission apparatus configured to store a use condition of the electronic content and configured to determine whether the use condition is fulfilled or not, when an instruction is given to reproduce the electronic content from an external reproduction device.

Optional combinations of the aforementioned constituting elements, and implementations of the invention in the form of apparatuses, methods, systems, computer programs, recording media that store the programs, and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 6 is a diagram showing a structure of a temporary use information table.

DETAILED DESCRIPTION OF THE INVENTION

Figure 1:
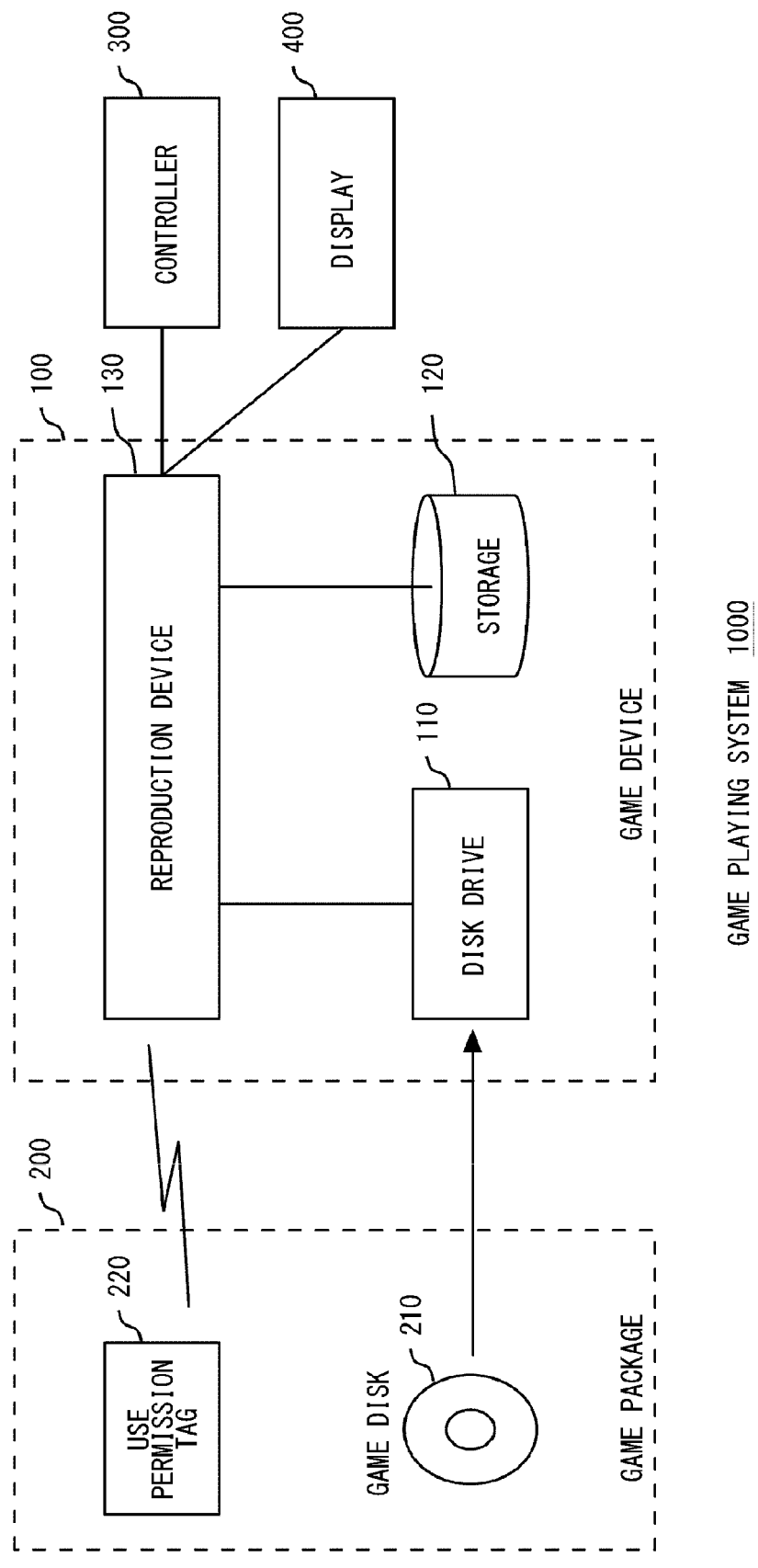
FIG. 1 illustrates a structure of a game playing system according to an embodiment.

The invention will now be described by reference to the preferred embodiments. This does not intend to limit the scope of the present invention, but to exemplify the invention.

The development of electronic content including game applications (APs) is costly and therefore in a content business it is vital to redistribute part of proceeds from sales of the electronic content to the developers. On the other hand, the electronic content is being bought and sold in second-hand markets. In such a scheme where the electronic content is bought and sold in the second-hand markets or the like, the sales proceeds resulting therefrom are not redistributed to the developers. Also, since the users who have purchased the second-hand items are somehow no longer potential buyers of the content, the developers would lose their profits otherwise gained in the first place.

As a technique to suppress the second-hand sales and purchase, a user may be first required to send a password or the like to a remote authentication server from a reproduction device (game player) via the Internet and the reproduction of content may be permitted only for the device that has succeeded in authentication. However, where the reproduction device is not connected to the Internet, use of the content cannot be controlled. Also, where the connection to the Internet is an absolute requirement, user's convenience may be significantly reduced. Besides, users may communicate to share the password between them and therefore the second-hand sales and purchase cannot be eliminated reliably.

In view of the foregoing problems described above, according to the present embodiment, a recording medium and a radiofrequency (RF) tag storing the terms of use (use condition) are included in the same packet (package) of electronic content. Proposed is an electronic content processing system where a usage mode of the electronic content is determined based on whether a reproduction entity, such as a reproduction device or user of the electronic content fulfills the use condition or not.

More specifically, a reproduction device (player), which is to reproduce (play) electronic content, conveys unique information, which can uniquely identify the reproduction device from among a large number of reproduction devices, to a use permission tag. The RF tag verifies the unique information against the use condition and conveys this verification result to the reproduction device. In the present embodiment, one of "permission information", "temporary permission information", and "rejection information" is conveyed as the verification result. Here, the "permission information" indicates that the use of electronic content is permitted, the "temporary permission information" indicates that the use thereof is temporarily permitted, and the "rejection information" indicates that the use thereof is denied. The reproduction device executes the reproduction of electronic content or rejects it according to the type of information conveyed from the use permission tag.

According to the present embodiment, realized is the electronic content processing system that reliably restricts the use of electronic content dealt in the second-hand markets. As a result, the dealing of electronic content in the second-hand markets is suppressed, which in turn supports the redistribution of part of proceeds from sales of the electronic content to the developers. Though in the following description a game application (AP) is exemplified as the electronic content, the present embodiment is similarly applicable to various kinds of electronic content such as an office suite, images, and music content.

FIG. 1 illustrates a structure of a game playing system 1000 according to an embodiment. A game device 100 is a stationary game device, and the game device 100 includes a disk drive 110, a storage 120, and a reproduction device 130 connected to the disk driven 110 and the storage 120. A game packages 200 is a product package distributed in the commercial transactions, and the game package 100 is supplied with a game disk 210 and a use permission tag 220. In other words, the game disk 210 and the use permission tag 220 are commercially released and transacted as a set and are also distributed integrally as an inseparable set, that is, are distributed as a bundle.

The game disk 210 is an optical disk medium that stores various types of data used to execute a game. Recorded in the game disk 210 are a disk ID that is an ID, unique to the game disk 210, which can uniquely identify the game disk 210 from among a plurality of game disks, a content key that is key data used for encryption, and an encrypted AP that is data where the game AP has been encrypted with the content key. When the reproduction device of the game AP is to be restricted, in the present embodiment the data indicating accordingly is set in a predetermined field of the disk ID. For example, a specific bit of the disk ID may be set to "1".

The disk drive 110 is an optical drive that reads various types of data from the game disk 210, and sends the data read from the game disk 210 to the reproduction device 130. The detailed structure of the disk drive 110 will be discussed later. The storage 120 is a hard disk drive that stores data that the reproduction device 130 is to store in a non-volatile manner.

The use permission tag 220 is an RF tag that wirelessly communicates with the reproduction device 130 and may be a non-contact IC card, for instance. The use permission tag 220 determines whether use of game AP is permitted or not, based on the information received from the reproduction device 130, and conveys its decision result to the reproduction device 130. Here, the decision result is information on permission, temporary permission, or rejection. The detailed structure of the use permission tag 220 will be discussed later.

The reproduction device 130 is an information processing apparatus that reproduces game content by acquiring a game AP from the disk drive 110 and then performing the information processing according to the game AP. Also, the reproduction device 130 may be said to be a game console that controls games. The reproduction device 130 controls a game based on a user's operation on the controller 300 and displays a game screen on a display 400. The detailed structure of the reproduction device will be described later.

Though the game device 100 is shown in FIG. 1 as the stationary game device, the game device 100 may be a portable game device and, in such a case, the controller 300 and the display 400 may be formed integrally with the game device 100. Also, the game 100 may be a general-purpose personal computer (PC).

The details concerning each component shown in FIG. 1 will be explained using the block diagrams. Each block shown in the block diagrams of the present patent specification may be achieved hardwarewise by elements, electronic circuits and mechanical devices such as a CPU (MPU), memory, HDD and the like of a computer, and softwarewise by computer programs and the like. Depicted in the block diagrams are functional blocks implemented by cooperation of hardware and software. Therefore, it will be obvious to those skilled in the art that the functional blocks may be implemented by a variety of manners. For example, in the reproduction device 130, software modules corresponding to the respective functional blocks may be executed by a general-purpose microprocessor. Also, in the disk drive 110 or the use permission tag 220, software modules corresponding to the respective functional blocks may be executed by a dedicated microcontroller.

Figure 2:
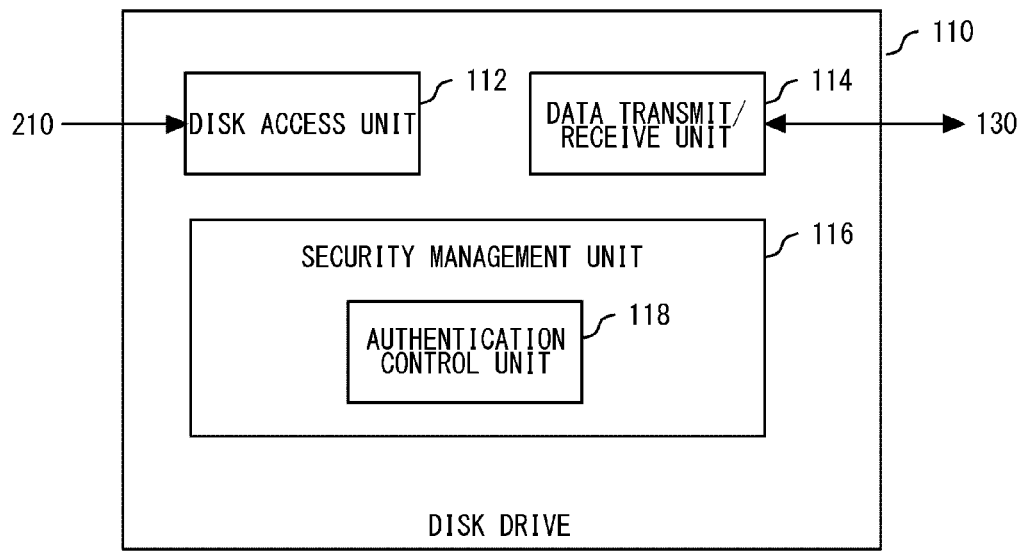
FIG. 2 is a block diagram showing a functional structure of a disk shown in FIG. 1.

FIG. 2 is a block diagram showing a functional structure of the disk drive 110 of FIG. 1. The disk drive 110 includes a disk access unit 112, a disk transmit/receive unit 114, and a security management unit 116. The security management unit 116 includes an authentication control unit 118.

The disk access unit 112 reads out various types of data stored in the game disk 210. The data transmit/receive unit 114 sends various types of data to the reproduction device 130 and receives various types of data from the reproduction device 130.

When the security management unit 116 receives acquisition requests for a disk ID, a content key and an encrypted AP from the reproduction device 130, the security management unit 116 supplies the disk ID, the content key and the encrypted AP stored in the game disk, respectively, to the reproduction device 130.

When the temporary permission information supplied from the use permission tag 220 is received via the reproduction device 130, the security management unit 116 determines if the temporary permission information is legitimate (e.g., if the temporary permission information agrees with a predetermined data format). If the temporary permission information is legitimate, the content key stored in the game disk 210 will be supplied to the reproduction device 130. This temporary information will not be saved permanently (in a non-volatile manner) in the disk drive 110. The authentication control unit 118 controls a communication session for the security management unit 144 of the reproduction device 130 (described later) and a communication session for the security management unit 226 of the use permission tag 220 (described later). The detail of the authentication control unit 118 will be discussed later.

Figure 3:
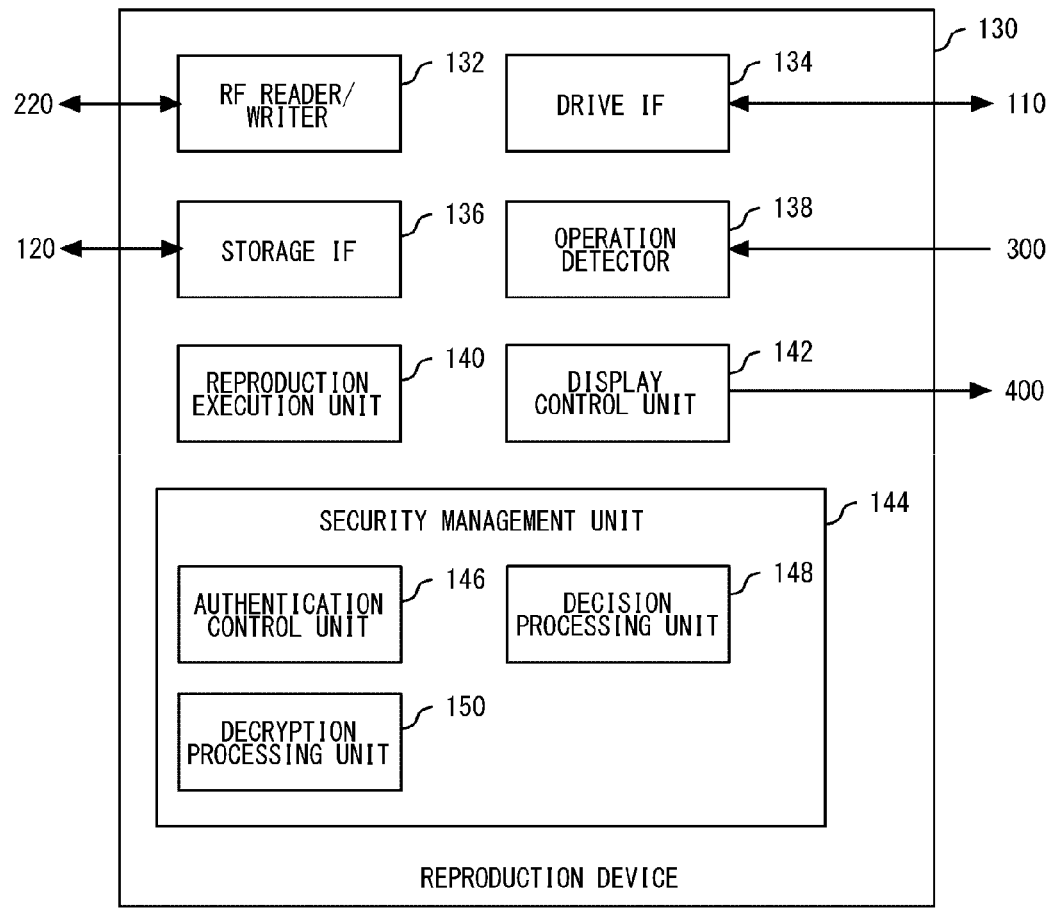
FIG. 3 is a block diagram showing a functional structure of a reproduction device shown in FIG. 1.

FIG. 3 is a block diagram showing a functional structure of the reproduction device 130 of FIG. 1. The reproduction device 130 includes an RF reader/writer (hereinafter referred to as "RFRW") 132, a drive interface (IF) 134, a storage IF 136, an operation detector 138, a reproduction execution unit 140, a display control unit 142, and a security management unit 144. The security management unit 144 includes an authentication control unit 146, a decision processing unit 148, a decryption processing unit 150.

The RFRW 132, which wirelessly communicates with the use permission tag 220 via a not-shown antenna, transmits the data received from the security management unit 144 to the use permission tag 220 and sends out the data received from the use permission tag 220 to the security management unit 144.

The drive IF 134, which provides a function of interfacing with the disk drive 110, sends various types of data to the disk drive 110 and receives various types of data from the disk drive 110. The storage IF 136, which provides a function of interfacing with the storage 120, has various types of data stored in the storage 120 and reads out various types of data stored in the storage 120.

The operation detector 138 detects a user's operation on the controller 300 and conveys its operation input to each functional block. The reproduction execution unit 140 reproduces game content according to a game AP. More specifically, as the start of a game is permitted by the security management unit 144, the data of the game AP decrypted by the security management unit 144 is acquired as needed and executed. Then, image data to be displayed by the display 400 is sent to the display control unit 142 as appropriate. The display control unit 142 controls the displaying of a game screen on the display 400; for example, the display control unit 142 sends the data, on the screen sent from the reproduction execution unit 140, to the display 400 so as to be displayed thereon.

The authentication control unit 146 controls a communication session for the security management unit 116 of the disk drive 110 and a communication session for the security management unit 226 of the use permission tag 220 (described later). The detail of the authentication control unit 146 will be discussed later.

As an instruction to start the game is received in the operation detector 138, the decision processing unit 148 sends an acquisition request for a disk ID to the disk drive 110 and acquires the disk ID. If the data indicating that the reproduction device of game AP is restricted is not set in a predetermined field of the disk ID, the decision processing unit 148 will convey an instruction to permit the start of the game to the reproduction execution unit 140 and the decryption processing unit 150.

If the data indicating that the reproduction device of game AP is restricted is set in the predetermined field of the disk ID, the decision processing unit 148 will reference the storage 120 and thereby check to see if the permission information has already been stored. As will be discussed later, the permission information is decrypted with a secret key of the reproduction device 130 and is stored in the storage 120. Thus, the decision processing unit 148 decrypts the encrypted data using the secret key of the reproduction device 130 and then determines whether the content of the permission information stored is legitimate or not (e.g., whether it agrees with a predetermined data format).

If the legitimate permission information has already been stored in the storage 120, the decision processing unit 148 will display a screen, by which to have the user select whether the checking of authorization using the use permission tag 220 is to be skipped or not, on the display 400 via the display control unit 142. If the user selects to skip the checking of authorization using the use permission tag 220, the decision processing unit 148 will convey an instruction to permit the start of the game to the reproduction execution unit 140 and the decryption processing unit 150.

If the legitimate permission information is not stored in the storage 120 or if the user selects to check authorization using the use permission tag 220, the decision processing unit 148 will display a screen, by which to prompt the user to bring the use permission tag 220 close to the RFRW 132, on the display 400. On this screen, messages like "pass the use permission tag over the RF reader/writer" will be displayed. When the RFRW 132 detects that the use permission tag 220 has approached the RFRW 132, the decision processing unit 148 conveys information on the request for reproduction to the user permission tag 220 via the RFRW 132. In this reproduction request information, the disk ID and an ID, unique to the reproduction device 130, which can uniquely identify the reproduction device 130 (hereinafter referred to as "reproduction device ID" also) are set such that the disk ID and the reproduction device ID are associated with each other. Examples of the reproduction ID include a manufacturer's serial number of the reproduction device and a medium access control (MAC) address.

If the permission information is conveyed from the use permission tag 220 as a response to the notification of the reproduction request information, the decision processing unit 148 will store the use permission information in the storage 120 and, at the same time, convey an instruction to permit the start of the game to the reproduction execution unit 140 and the decryption processing unit 150. When the use permission information is to be stored in the storage 120, the decision processing unit 140 encrypts the permission information using a secret key that has been determined beforehand in the reproduction device 130, and stores the encrypted data in the storage 120. It is desired that the secret key is set during a manufacturing process, for instance, and therefore it is concealed to the user.

If the rejection information is conveyed from the use permission tag 220 as a response to the notification of the reproduction request information, the decision processing unit 148 will display a screen, indicating that it is unable to start the game (i.e., indicating to reject the start of the game), on the display 400. On this screen, for example, messages or any indication indicating that the use permission tag 220 does not comply with the game disk 210 may be displayed or those indicating that the number of temporary uses exceeds the maximum allowable number may be displayed.

If the start of the game is granted by the decision processing unit 148, the decryption processing unit 150 will send an acquisition request for a content key to the disk drive 110 and acquire the content key. As the acquisition request for game AP is received from the reproduction execution unit 140, the decryption processing unit 150 acquires the encrypted AP from the disk drive 110. Then, the encrypted AP is decrypted using the content key and the resulting game AP is sent to the reproduction execution unit 140, thereby executing the reproduction processing of the game. As described above, if the temporary permission information is conveyed to the disk drive 110 from the use permission tag 220, a content key will be supplied from the security management unit 116 of the disk drive 110 and then the decryption processing unit 150 will acquire the content key.

Figures 4, 5:
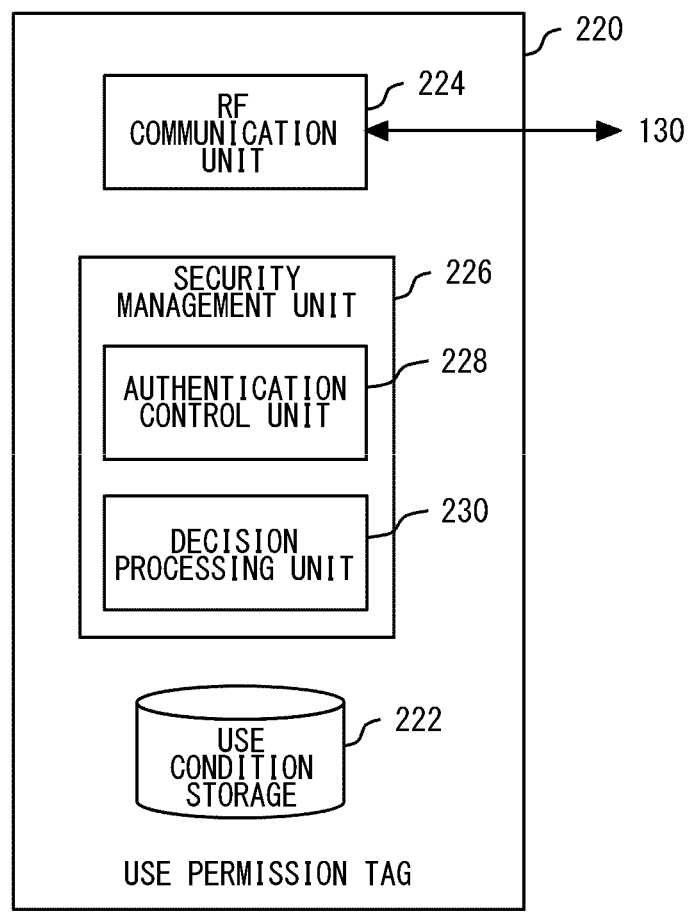
FIG. 4 is a block diagram showing a functional structure of a use permission tag shown in FIG. 1.
FIG. 5 is a diagram showing a structure of a legitimate use information table.

FIG. 4 is a block diagram showing a functional structure of the use permission tag 220 shown in FIG. 1. The use permission tag 220 includes a use condition storage 222, an RF communication unit 224, and a security management unit 226. The security management unit 226 performs a process of determining whether the use of game AP is permitted or rejected (use permit/reject decision processing). The security management unit 226 includes a authentication control unit 228 and a decision processing unit 230.

The use condition storage 222 is an electrically erasable and programmable read-only memory (EEPROM) where an attribute of a reproduction device having the right of usage of the game AP, namely the right of reproduction of the game AP, is stored as the use condition. Also, the use condition storage 222 is a secure data storage area where accesses from other than the security management unit 226 is blocked. Stored in the use condition storage 222 is a legitimate use information table that stores information on reproduction devices having legitimate right of usage of the game AP (hereinafter referred to as "legitimate use device" also). Further stored in the use condition storage 222 is a temporary use information table that stores reproduction devices having temporary right of usage of the game AP (hereinafter referred to as "temporary use device" also).

FIG. 5 is a diagram showing a structure of a legitimate use information table. In the legitimate use information table, the disk ID of the game disk 210 and the ID of the reproduction device 130 as a legitimate use device are stored such that they are associated with each other. The disk ID in the legitimate use information table is such that the disk ID of a game disk 210 included in the game package 200 (in the same game package) is predetermined when the game packages is shipped from a factory. On the other hand, a legitimate use device ID is not yet set at the time when the game package 200 is shipped from a factory and will be set through an initial use permit/reject processing.

FIG. 6 is a diagram showing a structure of a temporary use information table. In the temporary information table, the disk ID of the game AP and the ID of the reproduction device 130 as a temporary use device are stored in association with the number of times for which the temporary use is permitted. The record of the temporary use information table is typically not set at the time of shipment from a factory, and will be set as needed in a use permit/reject processing done from the second time onwards.

Referring back to FIG. 4, the RF communication unit 224 wirelessly communicates with the reproduction device 130 via a not-shown antenna. And the RF communication unit 224 sends data received from the security management unit 226 to the reproduction device 130 and sends data received from the reproduction device 130 to the security management unit 226. The authentication control unit 228 controls a communication session for the security management unit 116 of the disk drive 110 and controls a communication session for the security management unit 144 of the reproduction device 130. The detail of the authentication control unit 228 will be discussed later.

As the decision processing unit 230 receives the reproduction request information, which is a combination of the disk ID and the reproduction device ID, from the reproduction device 130, the decision processing unit 230 references the use condition storage 22 and thereby determines whether use of the game AP is permitted or not. More specifically, the reproduction request information is checked against the information of the legitimate use information table and both whether the disk ID is legitimate or not and whether the reproduction device ID has the legitimate right of reproduction of the game AP or not are determined, thereby determining whether execution of the game AP is permitted or not.

Even though the reproduction device 130 does not have the legitimate right of usage of the game AP, namely the right of reproduction of the game AP, the decision processing unit 230 permits the reproduction device 130 to temporarily reproduce the game AP for a predetermined period of time. In the present embodiment, a temporary use is permitted to the reproduction device 130, which does not have the legitimate right of usage, on the condition that the number of temporary uses is within a predetermined maximum allowable number (e.g., five times). If, however, the reproduction device ID having a legitimate reproduction right of usage is received after the temporary use has been permitted, the number of temporary uses will be reset. Thus, the temporary use beyond the maximum allowable number initially set is possible. In a modification to the present embodiment, the period of time during which the temporary use is permitted may be the number of hours or the number of days, such as 24 hours or 5 days, instead of the number of times.

The decision processing unit 230 also conveys the permission information or rejection information to the reproduction device 130 as a result of the use permit/reject decision processing or conveys the temporary permission information to the disk drive 110 as a result of the use permit/reject decision processing. The detail of use permit/reject decision processing of the decision processing unit 230 will be described later.

When data is to be transmitted and received between the security management unit 116 of the disk drive 110 and the security management unit 144 of the reproduction device 130, a communication session is established between the authentication control unit 118 of the security management unit 116 and the authentication control unit 146 of the security management unit 144. Then a session key, which is determined uniquely in the communication session, is acquired. Here, the session key takes a different value for each communication session.

More specifically, the authentication control unit 146 of the security management unit 144 conveys the identity information on the reproduction device 130 (e.g., a hash value of the device ID) to the security management unit 116. The authentication control unit 118 of the security management unit 116 determines whether the thus conveyed identity information on the reproduction device 130 agrees with the identity information on a legitimate reproduction device stored beforehand or not. For example, whether the hash value based on the device ID of the legitimate reproduction device stored beforehand agrees with the hash value conveyed from the reproduction device 130 or not may be determined. At the same time, the authentication control unit 118 of the security management unit 116 conveys the identity information on the disk drive 110 (e.g., a hash value of the device ID) to the security management unit 144. The authentication control unit 146 of the security management unit 144 determines whether the thus conveyed identity information on the disk drive 110 agrees with the identity information on a legitimate disk drive stored beforehand or not. For example, whether the hash value based on the device ID of the legitimate disk drive stored beforehand agrees with the hash value conveyed from the disk drive 110 or not may be determined. In this manner, the mutual authentication processes of determining whether a transmission destination is a legitimate device or not are performed at both the reproduction device 130 and the disk drive 110. If the mutual authentication processes are successful, at least either one of the authentication control unit 146 of the security management unit 144 and the authentication control unit 118 of the security management unit 116 will issue a session key and then the identical session key will be stored in both of them.

The authentication control unit 118 of the security management unit 116 encrypts data, which is to be sent from the disk drive 110 to the reproduction device 130, more specifically the data being a disk ID and/or a content key, using the session key and then transmits the encrypted data to the reproduction device 130. The authentication control unit 146 of the security management unit 144 decrypts the encrypted data sent from the disk drive 110, using the session key and then acquires the disk ID and/or content key.

Similarly, when data is to be transmitted and received between the security management unit 144 of the reproduction device 130 and the security management unit 226 of the use permission tag 220, a communication session is established between the authentication control unit 146 of the security management unit 144 and the authentication control unit 228 of the security management unit 226. Similarly to the above, the authentication control unit 146 of the security management unit 144 and the authentication control unit 228 of the security management unit 226 mutually authenticate that a transmission destination is a legitimate device; then they acquire and share a unique session key on the condition that the mutual authentication processes have been successful. The authentication control unit 146 of the security management unit 144 encrypts the reproduction request information, using the session key and then transmits the encrypted reproduction request information to the use permission tag 220. The authentication control unit 228 of the security management unit 226 decrypts the encrypted data, using the session key and then acquires the reproduction request information. The authentication control unit 228 of the security management unit 226 encrypts a result of the use permit/reject decision processing, namely the permission information or rejection information, using the session key and then transmits the encrypted result thereof to the reproduction device 130. The authentication control unit 146 of the security management unit 144 decrypts the encrypted data, using the session key and then acquires the result of the use permit/reject decision processing.

Similarly, when data is to be transmitted and received between the security management unit 226 of the use permission tag 220 and the security management unit 116 of the disk drive 110, a communication session is established between the authentication control unit 228 of the security management unit 226 and the authentication control unit 118 of the security management unit 116. Similarly to the above, the security management unit 226 of the use permission tag 220 and the security management unit 116 of the disk drive 110 mutually authenticate that a transmission destination is a legitimate device; then they acquire and share a unique session key on the condition that the mutual authentication processes have been successful. The communication session is a logical communication channel. As a physical communication channel, the communication session may include the following communication paths, for instance, (1) between the authentication control unit 118 and the data transmit/receive unit 114, (2) between the data transmit/receive unit 114 and the drive IF 134, (3) between the drive IF 134 and the RFRW 132, (4) between the RFRW 132 and the RF communication unit 224, and (5) between the RF communication unit 224 and the authentication control unit 228. The authentication control unit 228 of the security management unit 226 encrypts the temporary permission information with the session key, and transmits the encrypted data to the disk drive 110 via the reproduction device 130. The authentication control unit 118 of the security management unit 116 decrypts the encrypted data with the session key and then acquires the temporary permission information.

Figure 7:
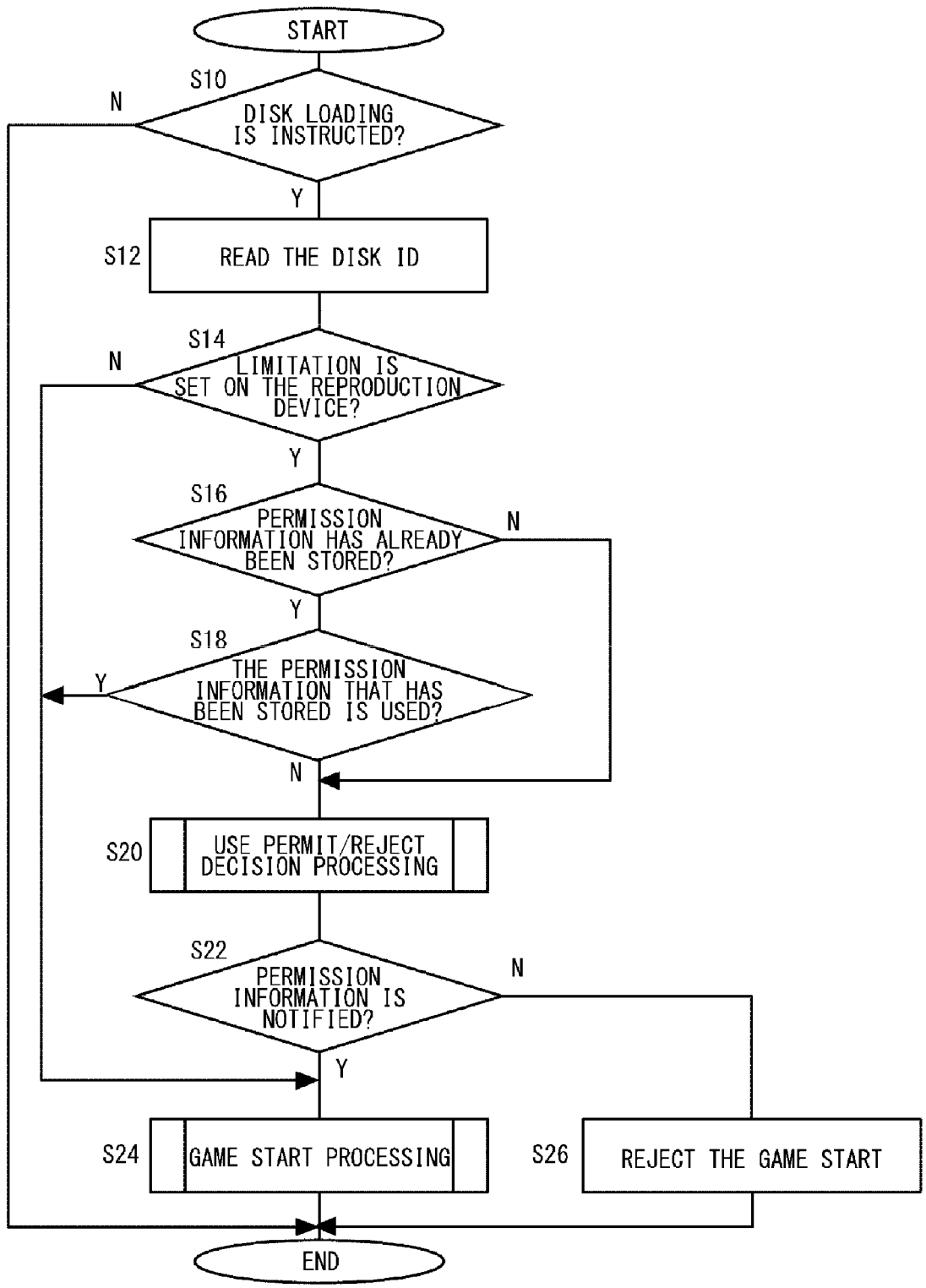
FIG. 7 is a flowchart showing an operation of a game playing system.

An operation implementing the above-described structure is as follows. FIG. 7 is a flowchart showing an operation of the game playing system 1000. In the flowcharts of the patent specification of the present invention, the procedure of each structural component is shown using S (the capital letter of "Step"), which means a step, and numbers combined. If a determining process is executed in a processing indicated by the combination of S and a number and if the decision result is positive, "Y" (the capital letter of "Yes") will be appended like "(Y of S10)". If, on the other hand, the decision result is negative, "N" (the capital letter of "No") will be appended like "(N of S10)".

As an instruction to load the game disk 210 is detected by the operation detector 128 of the reproduction device 130 (Y of S10), the security management unit 116 of the disk drive 110 acquires a disk ID from the game disk 210 and then conveys the acquired disk ID to the security management unit 144 of the reproduction device 130 (S12). If the data indicating that the reproduction device is restricted is set in the disk ID (Y of S14), if the permission information is stored in the storage 120 (Y of S16), and if the user instructs not to use the permission information stored (N of S18), the security management unit 144 of the reproduction device 130 will execute the use permit/reject decision processing in cooperation with the security management unit 226 of the use permission tag 220 (S20). If the permission information is not stored in the storage 120 (N of S16), Step S18 will be skipped.

If the permission information or temporary permission information is conveyed from the security management unit 226 of the use permission tag 220 as a result of the use permit/reject decision processing (Y of S22), a process of starting the game is executed (S24). The game is terminated as appropriate if a predetermined termination condition has been met, for example, if an exit operation by the user is detected after the execution of game AP has started. If the rejection information is conveyed from the security management unit 226 of the use permission tag 220 (N of S22), the security management unit 144 of the reproduction device 130 will inform the user of rejection of the start of the game (S26). If the user instructs to use the permission information that has already been stored in the storage 120 (Y of S18), Steps S20 and S22 will be skipped; if the data indicating that the reproduction device is restricted is not set in the disk ID (N of S14), Steps S16 to S22 will be skipped. If an instruction to load the game disk 210 is not detected (N of S10), the subsequence processes will be skipped and the flow of FIG. 7 will be terminated.

Figure 8:
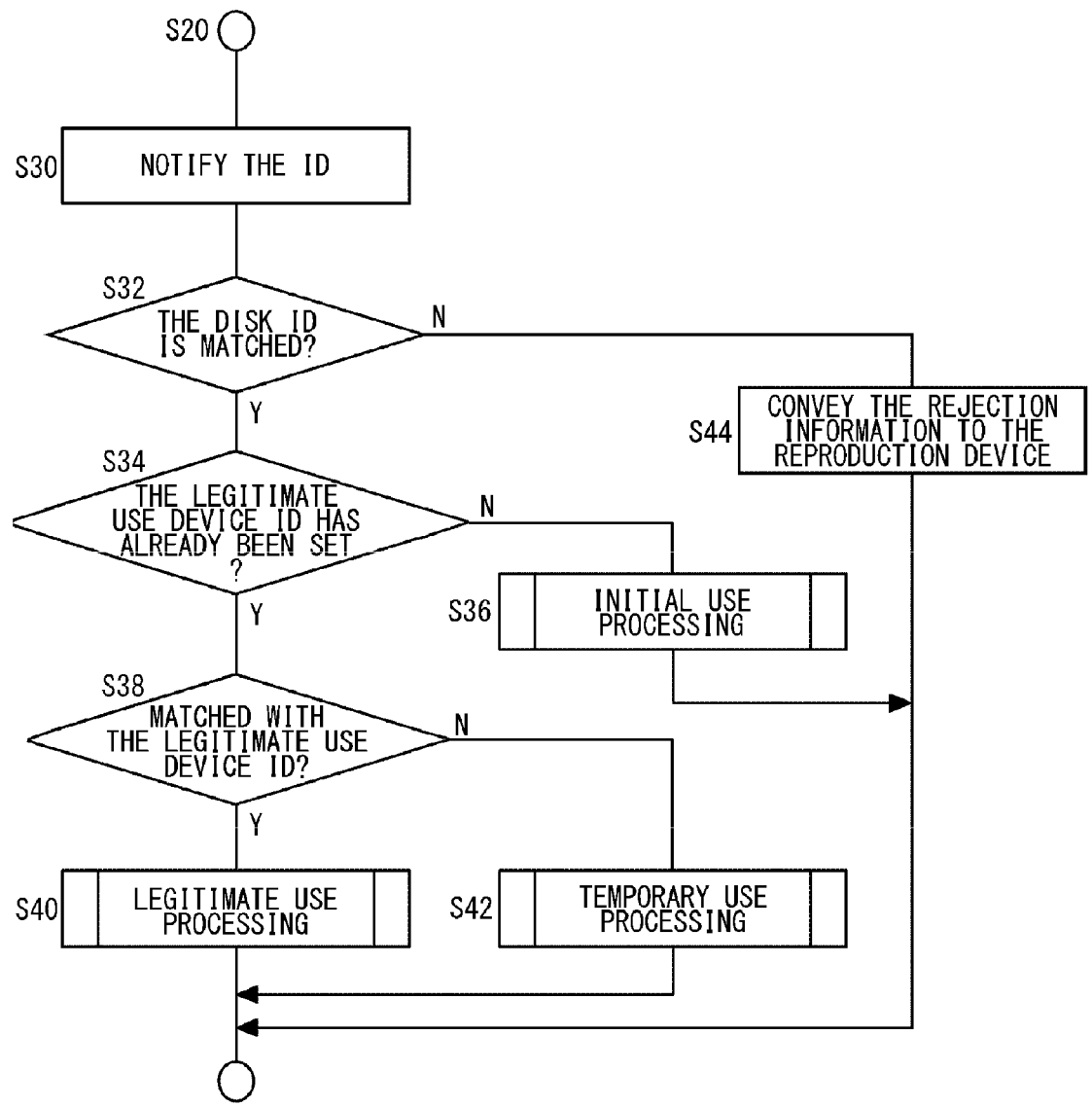
FIG. 8 is a flowchart showing in detail a use permit/reject decision processing of Step S20 of FIG. 7 that determines whether use is to be permitted or rejected.

FIG. 8 is a flowchart showing in detail a use permit/reject decision processing of Step S20 of FIG. 7 that determines whether use is to be permitted or rejected. The security management unit 144 of the reproduction device 130 conveys the reproduction request information including the disk ID and the reproduction device ID to the security management unit 226 of the use permission tag 220 (S30). If the disk ID in the reproduction request information does not match any of the disk IDs in the legitimate use information table (N of S32), the security management unit 226 of the use permission tag 220 will convey the rejection information to the reproduction device 130 (S44). If the disk ID in the reproduction request information matches a disk ID in the legitimate use information table (Y of S32) and if a legitimate use device ID is not set in the legitimate use information table (N of S34), the security management unit 226 will execute an initial use processing (S36). If a legitimate use device ID has already been set in the legitimate use information table (Y of S34) and if the reproduction device ID in the reproduction request information matches the legitimate use device ID (Y of S38), the security management unit 226 will execute a legitimate use processing (S40). If the reproduction device ID in the reproduction request information does not match the legitimate use device ID (N of S38), the security management unit 226 will execute a temporary use processing (S40).

Figure 9:
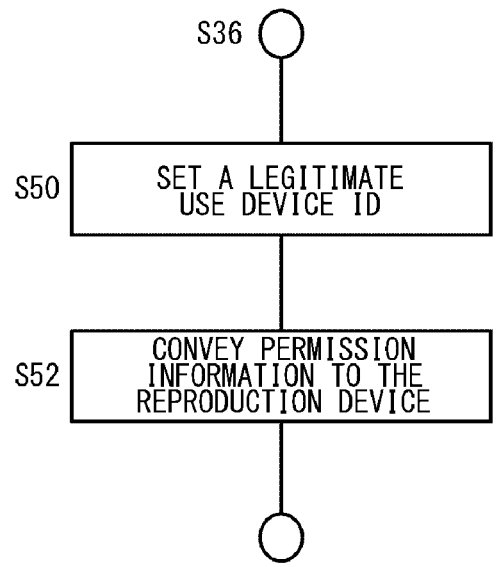
FIG. 9 is a flowchart showing in detail an initial use processing of Step S36 of FIG. 8.

FIG. 9 is a flowchart showing in detail the initial use processing of Step S36 of FIG. 8. The security management unit 226 of the use permission tag 220 sets the reproduction ID of the reproduction request information in the legitimate use information table as a legitimate use device ID (S50). Then the permission information encrypted with the session key communicated with the reproduction device 130 is supplied to the reproduction device 130. (S52).

Figure 10:
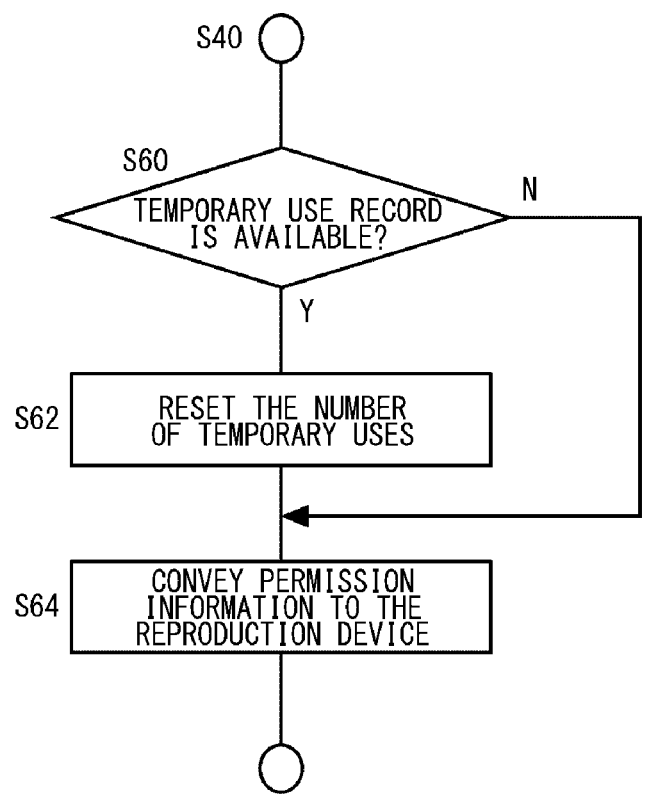
FIG. 10 is a flowchart showing in detail a legitimate use processing of Step S40 of FIG. 8.

FIG. 10 is a flowchart showing in detail the legitimate use processing of Step S40 of FIG. 8. If any record indicating a temporary use is in the temporary use information table (Y of S60), the security management unit 226 of the use permission tag 220 will reset the number of temporary uses for each record (S62). For example, the number of temporary uses for all the records in the temporary use information table may be initialized to "0" or all the records may be deleted. If no record is set in the temporary use information table (N of S60), Step S62 will be skipped. The security management unit 226 conveys the permission information to the reproduction device 130 (S64).

Figure 11:
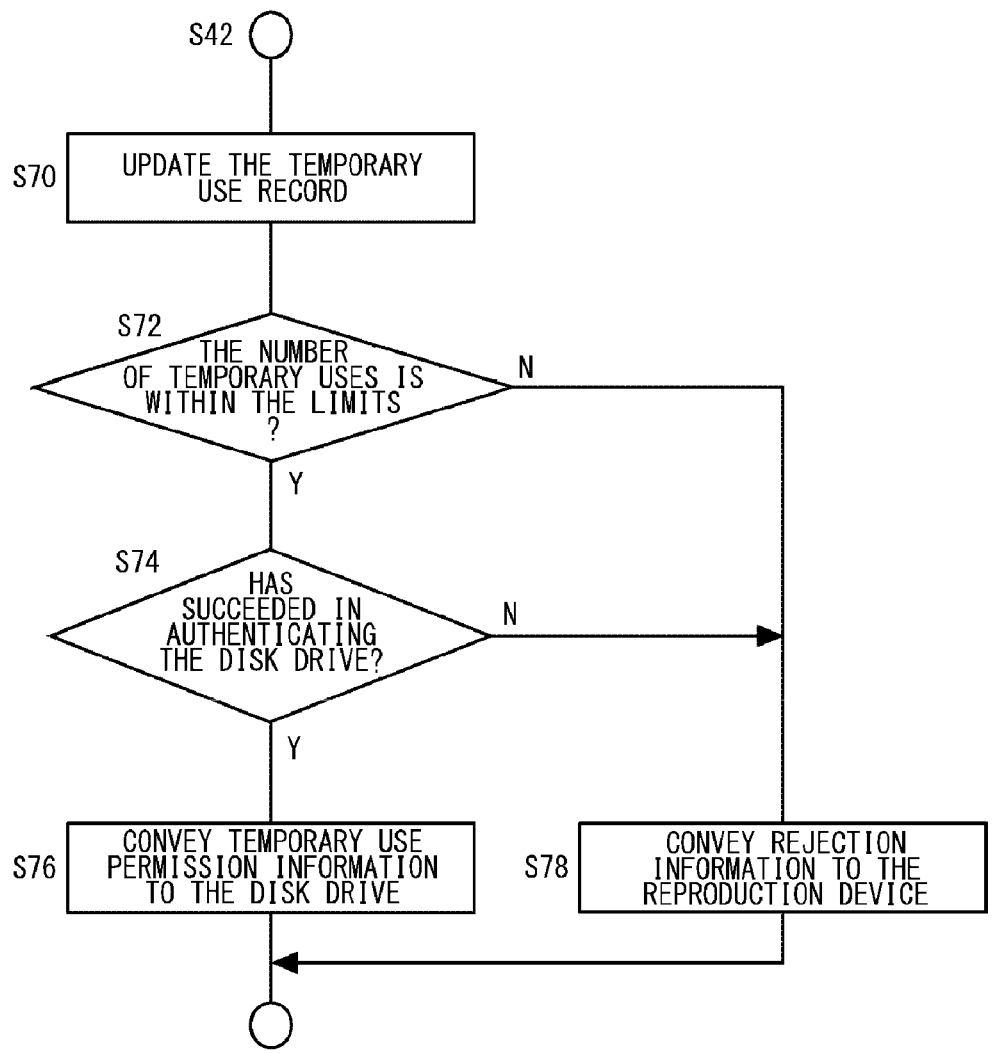
FIG. 11 is a flowchart showing in detail a temporary use processing of Step S42 of FIG. 8.

FIG. 11 is a flowchart showing in detail the temporary use processing of Step S42 of FIG. 8. The security management unit 226 of the use permission tag 220 updates the temporary information table based on the reproduction request information (S70). More specifically, if there is no record associated with a combination of a disk ID and a reproduction device ID in the reproduction request information, a record where the reproduction device ID is set to the temporary use device ID and the number of temporary uses is set to "1" will be inserted. if there is a record associated with a combination of a disk ID and a reproduction device ID in the reproduction request information, the number of temporary uses for the record will be incremented. If the number of temporary uses after change is equal to or less than the maximum allowable number (Y of S72), the security management unit 226 will directly authenticate whether the disk drive 110 is a legitimate disk drive or not. If the authentication is successful (Y of S74), the security management unit 226 will supply the temporary permission information, encrypted with the session key communicated with the disk drive 110, to the disk drive 110 (S76). If the number of temporary uses after the change exceeds the maximum allowable number (N of S72) or if it is determined that the disk drive 110 is an improper or illegitimate drive (N of S74), the rejection information will be conveyed to the reproduction device 130 (S78).

Figure 12:
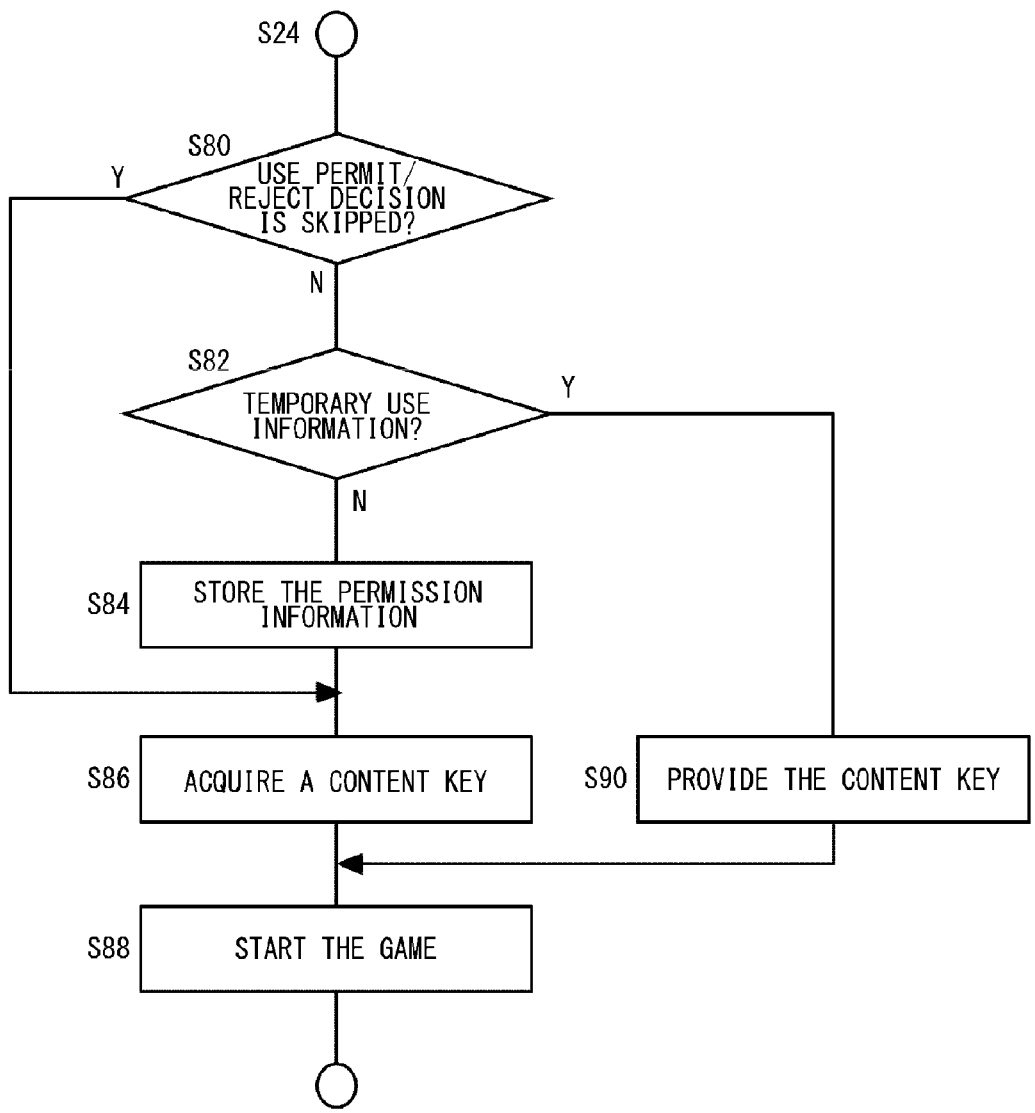
FIG. 12 is a flowchart showing in detail a game start processing of Step S24 of FIG. 7.

FIG. 12 is a flowchart showing in detail the game start processing of Step S24 of FIG. 7. If the use permit/reject decision processing of Step S20 of FIG. 7 is performed (N of S80) and the security management unit 144 of the reproduction device 130 receives the permission information (N of S82), the security management unit 144 will store the permission information in the storage 120 (S84). At the same time, the content key is obtained from the security management unit 116 of the disk drive 110 (S86). The security management unit 144 decrypts the encrypted game AP using the content key, and the reproduction execution unit 140 starts the processing of the game AP (S88). If the security management unit 116 of the disk drive 110 receives temporary permission information (Y of S82), the security management unit 116 will supply the content key to the security management unit 144 of the reproduction device 130 without permanently storing the temporary permission information (S90). After that, the processing of Step S88 is carried out. If the use permit/reject decision processing of Step S20 is skipped, namely, if the processing of N of S14 or Y of S18 is effected (Y of S80), Steps S82 and S84 will be skipped and the processing of Step S86 will be performed.

By employing the game playing system 1000 according to the present embodiment, the use permission tag 220 together with the game disk 210 is supplied to the user, and the use permission tag 220 actively determines the use permit/rejection of electronic content. Thereby, the use of game AP stored in the game disk 210 can be restricted as appropriate according to the attribute of a reproduction device. Consider, for example, a case where used is a game package 200 distributed in the second-hand market. Then the ID of reproduction device for the game disk 210 differs from the legitimate use device ID stored in the use permission tag 220, so that the game disk can be reproduced in a mode which is predetermined for those bought and sold in the second-hand market. Also, for example, a content key may be supplied to the reproduction device 130 and the encrypted game AP may be decrypted using the content key only if the reproduction device ID matches a legitimate use device ID. Hence, use of game APs bought and sold in the second-hand market can be eliminated.

Also, according to the game playing system 1000, once the permission information is supplied to a reproduction device 130, the use permit/reject decision processing using the use permission tag 220 will be skipped. Thus, many steps that the user should otherwise have taken can be saved and therefore the user's convenience can be improved. Also, since the permission information supplied to the reproduction device 130 is encrypted with a secret key of the reproduction device 130 and then stored. Thus, the encrypted data cannot be decrypted by other reproduction devices and therefore illegitimate use of the permission information can be prevented.

Also, according to the game playing system 1000, whether the use permit/reject decision processing using the use permission tag 220 is required or not can be determined and set depending on the content of the disk ID of the game disk 210. Thus, game APs whose reproduction device is restricted and those whose reproduction device is not restricted may be mixed together in one game playing system 1000. Hence, the use permit/reject decision processing using the use permission tag 220 may be carried out as needed.

Also, according to the game playing system 1000, the data transmitted and received among the security management unit 116 of the disk drive 110, the security management unit 144 of the reproduction device 130, and the security management unit 226 of the use permission tag 220 is encrypted using the session key. As a result, even though the data communicated between the security management units is illegally intercepted, it can be made extremely difficult to obtain information with which to protect the security from the intercepted data. Here, the information with which to protect the security from the intercepted data includes the disk ID, reproduction request information, permission information, temporary permission information, and content key, for instance. In other words, the illegitimate use of game APs can be prevented.

Also, according to the game playing system 1000, even when the reproduction device ID does not match the legitimate use device ID, the temporary use of a game AP is permitted within a predetermined number of times. Thereby, a trial period may be set for the game AP, thus prompting the user to purchase the official version of the game AP. Also, the temporary permission information is not permanently stored in the game device 100, thereby preventing the illegitimate use of the temporary permission information supplied from the use permission tag 220 and the illegitimate use of the game AP. Should the temporary permission information be illegally obtained, the temporary permission information would be an encrypted with a unique session key determined though the communication session between the use permission tag 220 and the disk drive 110. Thus, a person who has illegally acquired the temporary permission information is unable to decrypt the encrypted data of the temporary permission information, so that the illegitimate use of the temporary permission information can be prevented. Also, since the use permit/reject decision processing using the use permission tag 220 is required every time the game AP is used in the temporary use, the number of temporary uses can be reliably counted.

Also, if a reproduction device ID matching the legitimate use device ID is informed, the use permission tag 220 will reset the number of temporary uses. This allows the user having a plurality of game devices 100 to continue to use the game AP in the plurality of game devices.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention. Modifications will now be described below.

A description is now given of a first modification. Though not particularly mentioned in the above-described embodiments, the game package 200 may be such that the period of time during which the game AP stored in the game disk 210 is reproducible is predetermined. The retail price of the game package 200 is set to a price lower than the retail price of a game package in which no limit is imposed on the number of times, and the retail price of the game package 200 is set such that the shorter the reproducible period is, the lower the price will be. In such a case, the number of reproductions and the upper limit number of reproductions (maximum allowable number of reproductions) may be set in the legitimate use information table. The number of uses purchased by the user may be set, as the upper limit number of reproductions, by a point-of-sales terminal at a store. Whenever the security management unit 226 of the use permission tag 220 receives the reproduction request information from the legitimate use device, not only the disk ID and the reproduction device ID are checked but also the number of reproductions is incremented. And if the number of reproductions after the update is less than or equal to the maximum allowable number of reproductions, the use permission information will be supplied. If the number of reproductions after the update exceeds the maximum allowable number of reproductions, the rejection information will be supplied. According to the first modification, the restrictions for electronic content stored in the recording medium can be implemented by arbitrarily setting the number of reproductions. Also, the user is only required to pay for the service corresponding to the number of game-plays, so that the game package 200 that respond flexibly to a user's playing style can be provided.

A description is given of a second modification. Though in the above-described embodiments the disk ID is the ID unique to the game disk 210, in the second modification the disk ID may be an ID, unique to each game title, which is uniquely determined for each game title. This second modification is similarly configured to the above-described embodiments, thus achieving the same advantageous effects as those thereof.

A description is given of a third modification. Though in the above-described embodiments the ID of the reproduction device serving as a game AP is set in the reproduction request information, in the third modification the ID of a user that is the entity that utilizes the game AP may be set in the reproduction request information. The user ID may be a password but more desirable is an ID set based on information that is unique to the user and also difficult to be shared with the other users (e.g. biological information such as information on his/her fingerprint and/or iris). In this case, a biological information acquiring device such as a fingerprint reading device may be mounted on the game device 100, and the security management unit 144 of the reproduction device 130 may set the user ID using the biological information obtained by the biological information acquiring device. According to the third embodiment, when one person owns a plurality of game devices, all the game devices can be handled as legitimate use devices without regarding some of them as the temporary use devices. As a result, the use permit/rejection decision processing carried out by the use permission tag 220 can be skipped in all the game devices and therefore the user's convenience can be improved.

A description is given of a fourth modification. In the above-described embodiments, the security management unit 226 of the use permission tag 220 determines whether the reproduction device ID agrees with the legitimate use device ID or not. In the fourth modification, whether an attribute of the reproduction entity indicated by the reproduction device ID matches a use condition or not may be determined. Here, the attribute of the reproduction entity indicated by the reproduction device ID may be the product type of the reproduction device, the installation position of the reproduction device, the owner of the reproduction device or the like, for instance. For example, if the reproduction device ID indicates that it is installed in a specific company, the security management unit 226 may determine that the use condition has been met.

A description is given of a fifth modification. In the above-described embodiments, if the reproduction device ID and the legitimate use device ID do not match with each other, the reproduction of a game AP will be permitted within a predetermined number of times. In the fifth modification, if the temporary permission information is supplied from the use permission tag 220, only a part of the game AP may be reproduced by the reproduction device 130. Also, if the reproduction device ID and the legitimate use device ID do not match with each other, the rejection information may be supplied regardless of the number of temporary uses and the reproduction of the game AP will be rejected.

A description is given of a sixth modification. In the above-described embodiments, both the game disk 210 and the use permission tag 220 are included in the game package 200. However, the game disk 210 and the use permission tag 220 may be provided to the user with different timings. That is, it is only necessary that the user has the use permission tag 220 when he/she uses the game disk 210. For example, even if a distribution source (seller) of a game provides the game disk 210 to the user beforehand, the start timing of game play can be controlled with the timing with which the use permission tag 220 is supplied.

A description is given of a seventh modification. In the above-described embodiments, the use permission tag 220, which wirelessly communicates with the reproduction device 130, is exemplified as a device that carries out the use permit/reject decision processing. However, the device that carries out the use permit/reject decision processing is not limited to that mode. For example, the device carrying out the use permit/reject decision processing may be a universal serial bus (USB) dangle connected to the reproduction device 130 via USB.

A description is given of an eighth modification. In the above-described embodiments, an object on which its use permission or rejection is determined is exemplified by electronic content stored in the recording medium. In the eighth modification, it is stressed that the technical idea underlying the present invention described in this patent specification is also applicable to various products sold under license such as peripheral devices, accessories and supplies of the information processing apparatus.

A description is given of a ninth modification. In the above-described embodiments, the decision processing unit 148 of the reproduction device 130 encrypts the permission information conveyed from the use permission tag 220, using its own secret key and then stores the encrypted permission information in the storage 120. In the ninth modification, the decision processing unit 230 of the use permission tag 220 may store its own secret key and a public key by associating the secret key and the public key with each other and may convey the permission information encrypted with the secret key, together with the public key, to the reproduction device 130. The decision processing unit 148 of the reproduction device 130 may store the encrypted permission information in the storage 120 and may decrypt the encrypted permission information with the public key of the use permission tag 220 when the permission information needs to be referenced. This ninth modification achieves the same advantageous effects as those of the above-described embodiments, too. The same principle as in the ninth modification also applies to the temporary permission information, and the decision processing unit 230 of the use permission tag 220 may convey the temporary permission information, together with the public key, to the disk drive 110. Then the security management of the disk drive 110 may decrypt the encrypted temporary information using the public key of the use permission tag 220.

In still another modification, the decision processing unit 230 of the use permission tag 220 may convey permission information, a digital signature where a message digest (e.g., a hash value) generated from the permission information is encrypted with its own secret key, and its own public key to the reproduction device 130. The decision processing unit 148 of the reproduction device 130 may verify the message digest obtained from a result in which the notified digital signature has been decrypted with the public key of the use permission tag 220, against the message digest generated from the notified permission information. On the condition that both the message digests match with each other, it may be determined that the legitimate information has been notified, and the reproduction processing of the game AP may be continued. In this case, too, the decision processing unit 148 encrypts the legitimate information as appropriate and then stores the encrypted legitimate information in the storage 120.

A description is given of a tenth modification. The function of the use permission tag 220 in the above-described embodiments may be achieved by the game disk 210 and the disk drive 110. More specifically, the security management unit 116 of the disk drive 110 may further provide the same function as that of the security management unit 226 of the use permission tag 220. Also, the game disk 210 may be further comprised of the same function as that of the use condition storage 222 of the use permission tag 220. For example, the security management unit 116 may store the legitimate use information table and the temporary use information table in a secure storage area where accessing from locations other than the security management unit 116 of the disk drive 110 is prohibited. In this case, the security management unit 116 of the disk drive 110 receives the reproduction request information from the security management unit 144 of the reproduction device 130. Then the use permit/reject decision processing is carried out by referencing and updating, as appropriate, the legitimate use information table and the temporary use information table of the game disk 210. Since the tenth modification eliminates the RFRW 132 in the reproduction device 130, the manufacturing cost and the retail price of the reproduction device 130 can be reduced. Also, the use permission tag 220 is eliminated in the game package 200, so that the retail price of the game package 200 can be reduced.

Optional combinations of the aforementioned embodiments and modifications may also be useful as additional modes of the present invention. And it should be understood that new embodiments realized by such combinations and modifications thereof provide their own advantages.

It should be understood by those skilled in the art that the functions to be performed by the constituent features cited in the claims can also be realized by the components shown in the embodiments and modifications thereof alone or in combination.

What is claimed is:

1. A system for restricting the use of electronic content in a recording medium, comprising:
    a recording medium with electronic content stored thereon;
    a use permission tag associated with said recording medium, wherein said tag is an RF tag comprising a use condition storage that stores the terms of use of said content, including: (1) legitimate use information that identifies reproduction devices having legitimate right of usage of the electronic content, and (2) temporary use information that identifies reproduction devices having temporary right of usage of the content;
    a reproduction device configured to play said electronic content, wherein said reproduction device includes an RF reader-writer (RFRW) configured to wirelessly transmit identifier information to said permission tag, such that, upon receipt of said identifier information, the permission tag attempts to verify the reproduction device by comparing said identifier information to a use condition stored in said permission tag, and transmits a verification result to said reproduction device,
    wherein said verification result comprises one or more of permission information, temporary permission information, and rejection information, wherein said verification result determines whether and to what extent the reproduction device can execute reproduction of said electronic content; and
    a medium drive operably connected to said reproduction device,
    wherein when a user attempts to play said electronic content using said reproduction device, said reproduction device checks a storage to see if permission information is stored thereon, and if not, said user is prompted to bring said use permission tag within close proximity of the RFRW, so that a request for reproduction can be conveyed to said use permission tag via the RFRW, said reproduction request comprising said identifier information,
    wherein said use permission tag responds to said reproduction request by conveying permission information to said reproduction device when said identifier information satisfies a use condition and, upon receipt of the permission information, said reproduction device stores and encrypts the permission information in said storage and starts playing said electronic content.

2. The system of claim 1, wherein said identifier information transmitted from said reproduction device comprises a unique identifier corresponding to said reproduction device.

3. The system of claim 1, wherein the use permission tag is a radiofrequency (RF) tag.

4. The system of claim 3, wherein the reproduction device comprises an RF reader/writer configured to communicate with the use permission tag.

5. The system of claim 1, wherein said recording medium comprises a unique identifier and a content key, wherein a predetermined field of said identifier indicates whether use of said electronic content by said reproduction device is restricted.

6. The system of claim 5, wherein the medium drive comprises:
    an access unit configured to read data stored in said recording medium;
    a transmit/receive unit configured to transmit and receive data to and from the reproduction unit; and
    a security management unit,
    wherein the security management unit is configured to provide the recording medium identifier, the content key, and the encrypted content stored on said recording medium to the reproduction device when the security management unit receives valid permission information or temporary permission information.

7. The system of claim 6, wherein the reproduction device comprises a security management unit configured to decrypt the electronic content data using said content key when the reproduction device is verified by the use permission tag.

8. The system of claim 7, wherein the reproduction device comprises:
    a decision processing unit which decides whether to start processing the content based on the verification result received from the use permission tag; and
    a decryption processing unit which requests the content key for decrypting the content when permission to play the content is granted.

9. The system of claim 3, wherein the use permission tag comprises:
    a security management unit configured to determine whether use of the content is permitted.

10. The system of claim 3, wherein said stored information in said one or more tables comprises an identifier for the recording medium containing the content, and identifiers for zero or more reproduction devices permitted to use the content.

11. The system of claim 10, wherein a reproduction unit identifier is stored in a legitimate use information table of said one or more tables and is associated with said recording medium identifier when said reproduction unit identifier is verified as a legitimate use device by said use permission tag.

12. The system of claim 11 wherein said reproduction unit is configured to transmit identifier information to the use permission tag for verification, wherein the identifier information comprises an identifier corresponding to the reproduction unit and an identifier corresponding to the recording medium containing the content.

13. The system of claim 1, wherein, when permission information acquired from the use permission tag is not stored in a storage unit of said reproduction device, the security management unit of the reproduction device causes a message prompting a user to bring the use permission tag close to the reproduction device to be output.

14. A method for restricting the use of electronic content in a recording medium, comprising:
    conveying identifier information from a reproduction device to a use permission tag associated with a recording medium for the purpose of verifying the reproduction device, so as to allow a user to reproduce electronic content on said recording medium, wherein said use permission tag is an RF tag comprising a use condition storage that stores the terms of use of said content, including: (1) legitimate use information that identifies reproduction devices having legitimate right of usage of the electronic content, and (2) temporary use information that identifies reproduction devices having temporary right of usage of the content, wherein said reproduction device includes an RF reader-writer (RFRW) configured to wirelessly transmit said identifier information to said permission tag;

determining whether the identifier information conveyed from the reproduction device fulfills a use condition, wherein the use condition defines access and permission to reproduce the electronic content stored in said recording medium;

transmitting permission information to the reproduction device when the reproduction device identifier fulfills a use condition; and playing the electronic content when permission information is received at the reproduction device from the use permission tag, wherein when a user attempts to play said electronic content using said reproduction device, said reproduction device checks a storage to see if permission information is stored thereon, and if not, said user is prompted to bring said use permission tag within close proximity of the RFRW, so that a request for reproduction can be conveyed to said use permission tag via the RFRW, said reproduction request comprising said identifier information, wherein said use permission tag responds to said reproduction request by conveying permission information to said reproduction device when said identifier information satisfies a use condition and, upon receipt of the permission information, said reproduction device stores and encrypts the permission information in said storage and starts playing said electronic content, wherein the verification process is bypassed when said permission information is already stored in said storage area.

15. A package of electronic content, available in a commercial transaction, the package including and supplied with:
a recording medium storing the electronic content encrypted by using a predetermined content key;
a reproduction device configured to reproduce the electronic content, wherein said reproduction device includes an RF reader-writer (RFRW); and
a use permission tag, wherein said tag is an RF tag comprising a use condition storage that stores the terms of use of said content, including: (1) legitimate use information that identifies reproduction devices having legitimate right of usage of the electronic content, and (2) temporary use information that identifies reproduction devices having temporary right of usage of the content, the use permission tag including:

a receiving unit configured to receive an identifier from the reproduction device; and a determining unit configured to determine whether or not the identifier conveyed from the reproduction device fulfills the use condition and, when the identifier fulfills the use condition, cause the reproduction device to acquire the content key used to decrypt the electronic content, by supplying permission information indicating permission to reproduce the electronic content to the reproduction device, wherein, when the identifier fulfills a temporary use condition, the determining unit causes the content key to be provided to the reproduction device for decrypting the electronic content, by supplying to the reproduction unit temporary permission information indicating that reproduction of the electronic content is temporarily permitted, wherein when a user attempts to play said electronic content using said reproduction device, said reproduction device checks a storage to see if said permission information is stored thereon, and if not, said user is prompted to bring said use permission tag within close proximity of the RFRW, so that a request for reproduction can be conveyed to said use permission tag via the RFRW, said reproduction request comprising said identifier information, wherein said use permission tag responds to said reproduction request by conveying said permission information to said reproduction device when said identifier information satisfies a use condition and, upon receipt of said permission information, said reproduction device stores and encrypts said permission information in said storage and starts playing said electronic content.

16. The package of claim 15, wherein said identifier comprises a reproduction device identifier and an article identifier, said article identifier being an identifier for said electronic content or for said recording medium.

* * * * *